United States Patent
Miles

(10) Patent No.: US 8,851,249 B2
(45) Date of Patent: Oct. 7, 2014

(54) HYDRAULIC BRAKE MASTER CYLINDER

(75) Inventor: Jason Miles, Mukilteo, WA (US)

(73) Assignee: Tien Hsin Industries Co., Ltd., Taichung (TW)

( * ) Notice: Subject to any disclaimer, the term of this patent is extended or adjusted under 35 U.S.C. 154(b) by 131 days.

(21) Appl. No.: 13/598,840

(22) Filed: Aug. 30, 2012

(65) Prior Publication Data

US 2014/0060987 A1 Mar. 6, 2014

(51) Int. Cl.
*B60T 11/08* (2006.01)
*B60T 11/16* (2006.01)

(52) U.S. Cl.
USPC ............... 188/344; 188/24.11; 188/24.15; 188/24.22; 188/24.21

(58) Field of Classification Search
CPC ............ B62L 3/00; B62L 3/02; B62L 3/023; B62L 1/00; B62L 1/10; B62L 1/12; B62L 1/14; B62L 1/005; B60T 11/16; B60T 11/18; B60T 11/22; B60T 11/046; B60T 7/04; B60T 7/102; F16D 55/228; F15B 7/08

USPC .......... 188/344, 24.21, 24.22, 24.11, 24.15, 188/368, 265, 345, 196 BA, 181 A
See application file for complete search history.

(56) References Cited

U.S. PATENT DOCUMENTS

| | | | |
|---|---|---|---|
| 6,883,647 B1 * | 4/2005 | Wen | 188/24.22 |
| 7,942,250 B2 * | 5/2011 | Watarai et al. | 188/344 |
| 7,963,114 B2 * | 6/2011 | Moore | 60/594 |
| 2005/0199450 A1 * | 9/2005 | Campbell et al. | 188/24.15 |
| 2007/0051575 A1 * | 3/2007 | Lumpkin | 188/344 |
| 2009/0205330 A1 * | 8/2009 | Dunlap, III | 60/584 |

* cited by examiner

*Primary Examiner* — Anna Momper
*Assistant Examiner* — San Aung
(74) *Attorney, Agent, or Firm* — Rosenberg, Klein & Lee

(57) ABSTRACT

A hydraulic brake master cylinder includes a cylinder unit having first and second spaces, a channel communicating the spaces and an adjuster exposed outside; a piston slidably disposed in the first space; a first spring applying an elastic force to the piston; a rod moving relative to the piston; a second spring applying an elastic force to the rod; a seal attached to the rod and moving controllably to seal the channel; and a nut threaded onto the rod. The adjuster is rotatable to make the nut and the rod rotate with respect to each other so as to change the distance between the seal and the end of the channel to adjust the free stroke.

10 Claims, 10 Drawing Sheets

HYDRAULIC BRAKE MASTER CYLINDER

BACKGROUND OF THE INVENTION

1. Field of the Invention

The present invention relates generally to hydraulic brake master cylinders and more particularly, to a hydraulic brake master cylinder capable of pad contact point adjustment.

2. Description of Related Art

A hydraulic brake master cylinder of a bicycle is adapted to be mounted to a handle bar of the bicycle and connected with a brake to lever. During the process of user's pulling the brake lever toward the handle bar, brake fluid in the hydraulic brake master cylinder is vented into a hose and delivered to calipers so that the brake pads are forced to move to contact a brake disc so as to slow the bicycle.

Generally speaking, during the user's brake lever pressing process, the hydraulic brake master cylinder may be configured, to have a free stroke during which no brake fluid is vented out. The length of the free stroke influences how the brake lever feels to the user, how far the brake pads move and how far the brake lever must be pulled to slow the bicycle. The shorter the free stroke is, the faster the brake reacts and the firmer the brake feels.

The hydraulic brake master cylinder capable of pad contact point adjustment is well developed and commercially available. It allows the user to adjust the distance that the brake pads move and the brake effect by adjusting the free stroke thereof. However, conventional hydraulic brake master cylinders capable of pad contact point adjustment cannot be easily manufactured and assembled due to complicated constructions thereof. In addition, these hydraulic brake master cylinders are inconvenient in use because they can be adjusted only when the users utilize some tools. Therefore, hydraulic brake master cylinders capable of pad contact point adjustment still need further improvement.

The present invention has arisen to mitigate and/or obviate the afore-described disadvantages.

SUMMARY OF THE INVENTION

The present invention has been accomplished in view of the above-noted circumstances. It is an objective of the present invention to provide a hydraulic brake master cylinder capable of pad contact point adjustment, which can be adjusted without any tool and has a simple construction so as to be manufactured and assembled easily.

To attain the above objective, the present invention provides a hydraulic brake master cylinder which comprises a cylinder unit, a piston, a first spring, a rod, a second spring, a seal, and a nut threaded onto the rod. The cylinder unit includes a first space, a second space, a channel communicating the first space and the second space, an outlet communicating the first space with outside of the cylinder unit, and an adjuster exposed outside. The piston is provided with a guide hole and axially slidably disposed in the first space. The first spring applies an elastic force to the piston. The rod has a first end portion disposed in the guide hole of the piston in a way that the first end portion is slidable in the guide hole of the piston when the piston is forced to slide in the first space relative to the rod, and a second end portion disposed opposite to the first end portion. The second spring applies an elastic force to the second end portion of the rod. The seal is attached to the rod and movable with the rod to seal the channel so as to block the first space from communicating with the second space. The adjuster is rotatable to make the nut and the rod rotate with respect to each other so as to change a distance between the seal and the end of the channel.

The hydraulic brake master cylinder is applied to a bicycle handle bar in such a way that the cylinder unit is mounted to the handle bar of the bicycle; the piston is connected with a brake lever; the first space and second space are filled with brake fluid. During the process of user's pressing the brake lever to make the piston slide from an initial position toward the second space, the hydraulic brake master cylinder will have at first a free stroke during which no brake fluid is vented out until the seal seals the end of the channel. Thereafter, brake fluid will be vented out through the outlet. The user can rotate the adjuster to change the distance from the seal to the channel so as to adjust the free stroke of the hydraulic brake master cylinder. As a result, the hydraulic brake master cylinder is capable of pad contact point adjustment and can be adjusted without any tool. Another advantage is, the hydraulic brake master cylinder is simple in construction so as to be manufactured and assembled easily.

Further scope of applicability of the present invention become apparent from the detailed description given hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
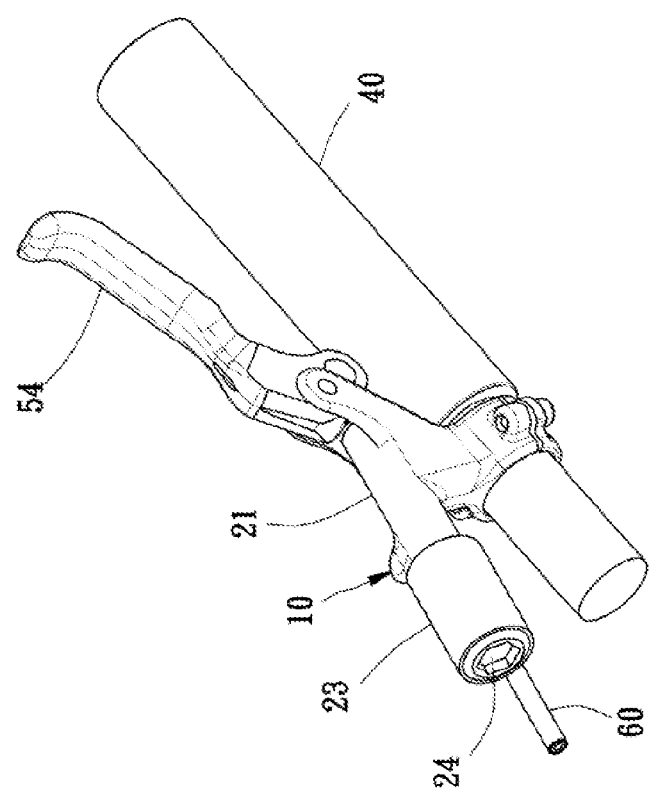
FIG. 1 is an assembled perspective view of a hydraulic brake master cylinder according to a first preferred embodiment of the present invention, which is mounted to a handle bar and connected with a brake lever.
Figure 2:
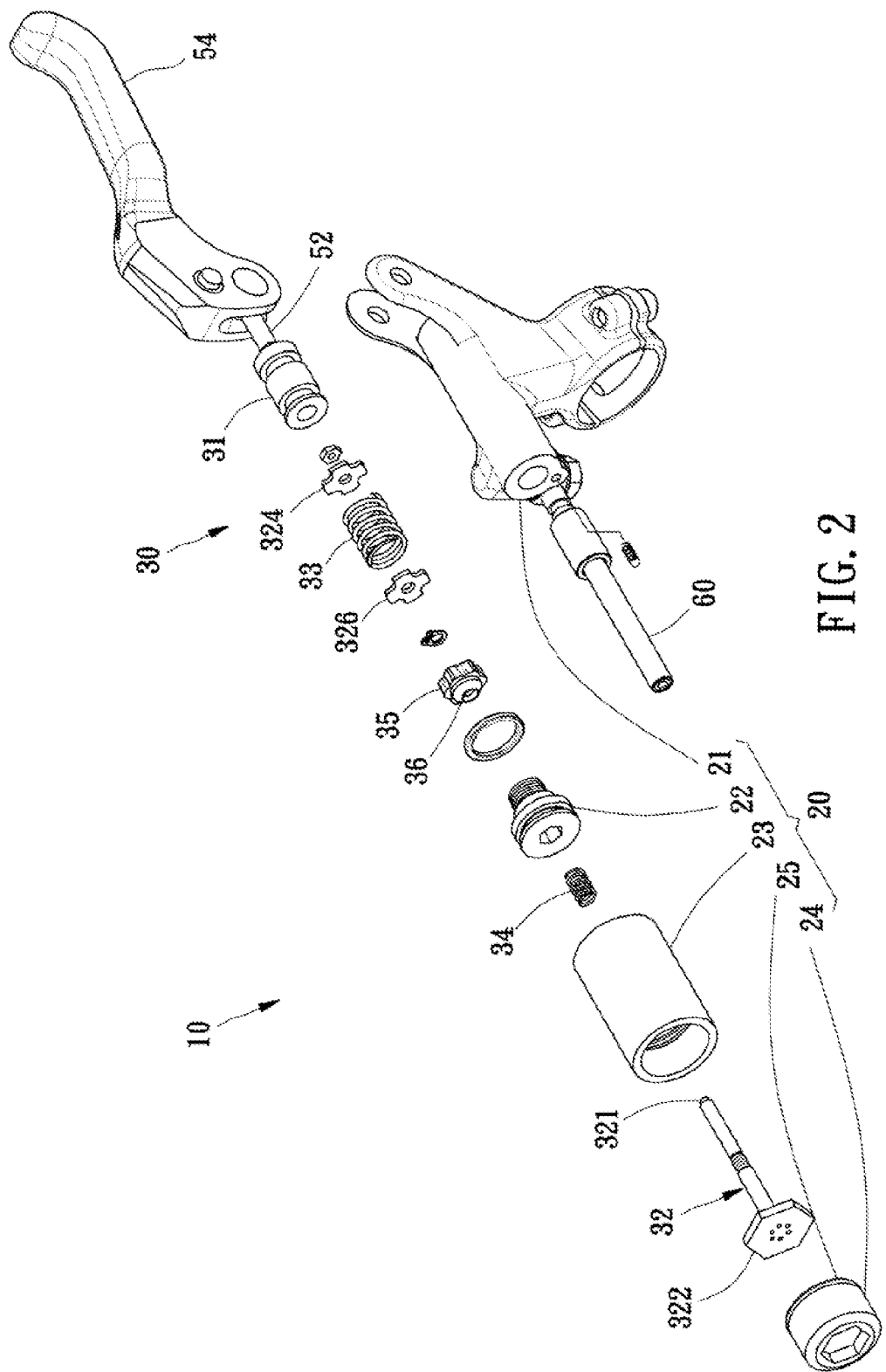
FIG. 2 is an exploded perspective view of the hydraulic brake master cylinder and the brake lever in FIG. 1.
Figure 3:
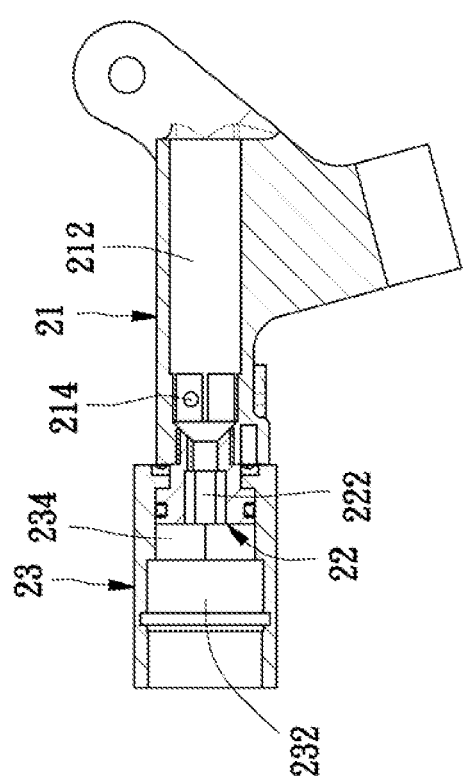
FIG. 3 is a sectional view of a main cylinder body, a connector and an adjuster of the hydraulic brake master cylinder according to the first preferred embodiment of the present invention.

First of all, it is to be mentioned that same reference numerals used in the following preferred embodiments and the appendix drawings designate same or similar elements throughout the specification for the purpose of concise illustration of the present invention.

As shown in FIGS. 1-4, a hydraulic brake master cylinder 10, which is provided by a first preferred embodiment of the present invention, comprises a cylinder unit 20 and an action mechanism 30 disposed in the cylinder unit 20.

The cylinder unit 20 primarily comprises a main cylinder body 21, a connector 22, an adjuster 23, a cap 24 and a membrane 25, wherein the main cylinder body 21, the connector 22 and the adjuster 23 are tubular. One end of the adjuster 23 is rotatably attached to the connector 22 which is threaded into one end of the main cylinder body 21. The membrane 25 is attached to one end of the cap 24 which is attached to another end of the adjuster 23, and the membrane 25 is located inside the adjuster 23. As a result, inside the cylinder unit 20 there are a first space 212 inside the main cylinder body 21, a second space 232 inside the adjuster 23, a channel 222 inside the connector 22 communicating the first space 212 and the second space 232, and a reserved space 242 developed between the membrane 25 and the cap 24. The main cylinder body 21 also has an outlet 214 communicating the first space 212 with the outside of the cylinder unit 20, and the adjuster 23 has a drive portion 234 defined by a hexagonal inner wall.

The action mechanism 30 primarily comprises a piston 31, a rod 32, a first spring 33, a second spring 34, a nut 35 and a seal 36.

Figure 4:
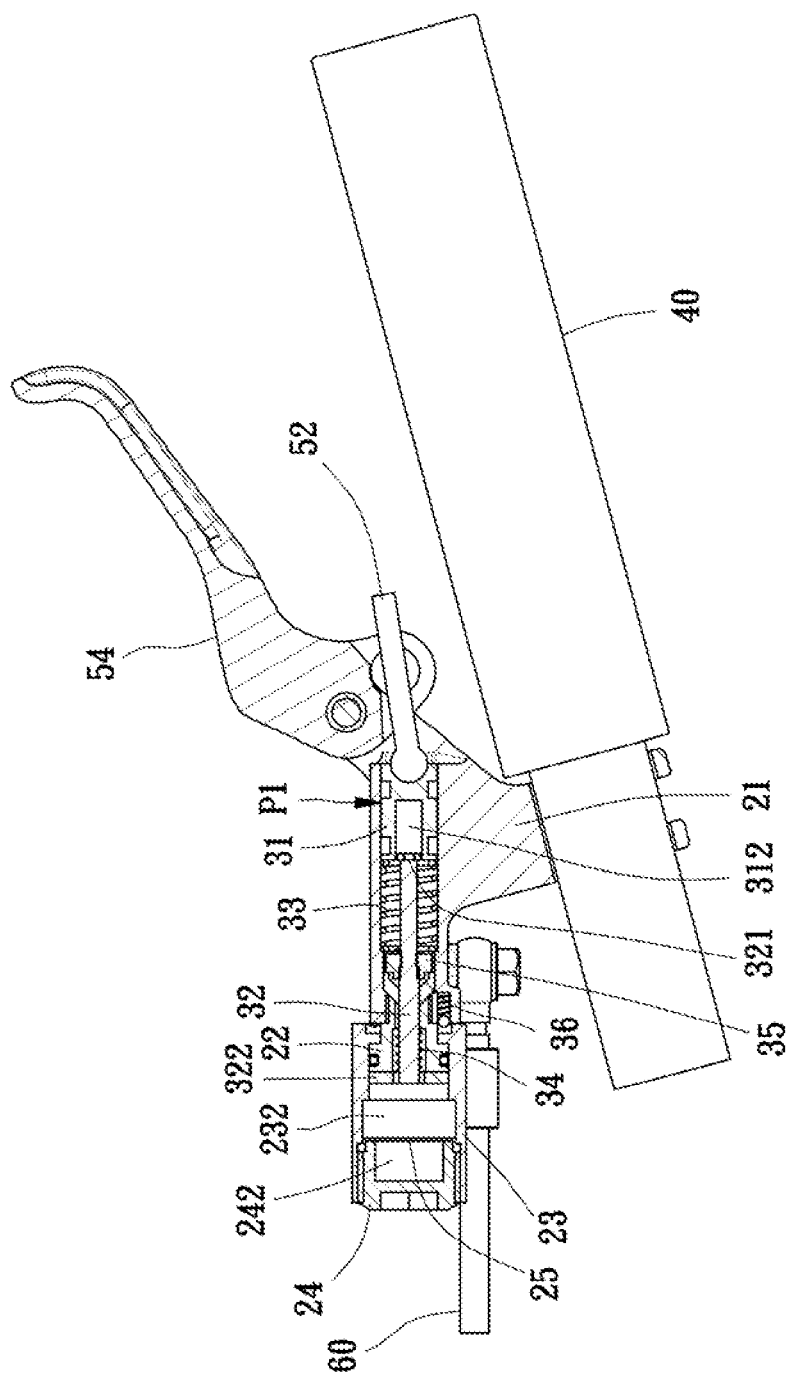
FIGS. 4-6 are sectional views illustrating the process of how the hydraulic brake master cylinder acts.

The piston 31, which has a guide hole 312 at its center at an end face thereof, is disposed in the first space 212 and slidable from an initial position P1 as shown in FIG. 4 toward the second space 232 when receiving an external force.

The rod 32 has a first end portion 321 limited in the guide hole 312 of the piston 31 by a first washer 324, and a second end portion 322 opposite to the first end portion 321 and disposed in the second space 232. The second end portion 322 is hexagonal and complementarily received in the drive portion 234 of the adjuster 23 so that the second end portion 322 is slidable along the drive portion 234, and the rod 32 is rotatable by the rotation motion of the adjuster 23 directly. In addition, the piston 31 is movable relative to the rod 32 to make the first end portion 321 of the rod 32 slide deep inside the guide hole 312.

The first spring 33 is a compression spring disposed in the first space 212 and stopped between the piston 31 and the main cylinder body 21 through the first washer 324 and a second washer 326 so as to provide an elastic force for driving the piston 31 to move back to the initial position P1.

The second spring 34 is a compression spring disposed in the second space 232 and stopped between the connector 22 and the second end portion 322 of the rod 32 so as to provide an elastic three to push the rod 32 toward the cap 24. Therefore, the second spring 34 can prohibit the first end portion 321 of the rod 32 from sliding along the guide hole 312 of the piston 31 to make the rod. 32 move with the piston 31.

The nut 35 is axially movably disposed in the first space 212 and threaded on to the rod 32. Because of the design of shape, the nut 35 can't rotate relative to the main cylinder body 21. When the rod 32 is rotated by the adjuster 23, the rod 32 rotates relative to the nut 35; meanwhile, the nut 35 slides along the rod 32 so that the position of the nut 35 relative to the rod 32 changes.

The seal 36, which is located between the nut 35 and the connector 22, is sleeved onto the rod 32 and fastened to the nut 35. The seal 36 is movable with the axial movement of the rod 32 seal one end of the channel 222 so as to block the first space 212 from communicating with the second space 232.

Figure 5:
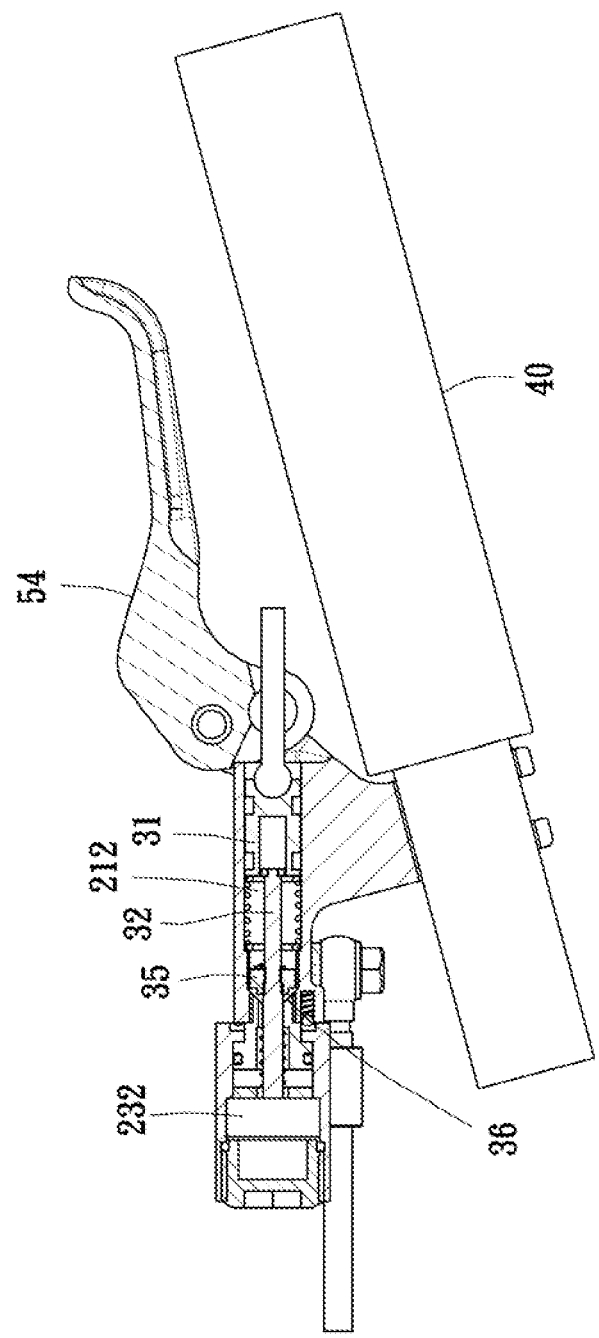
Figure 6:
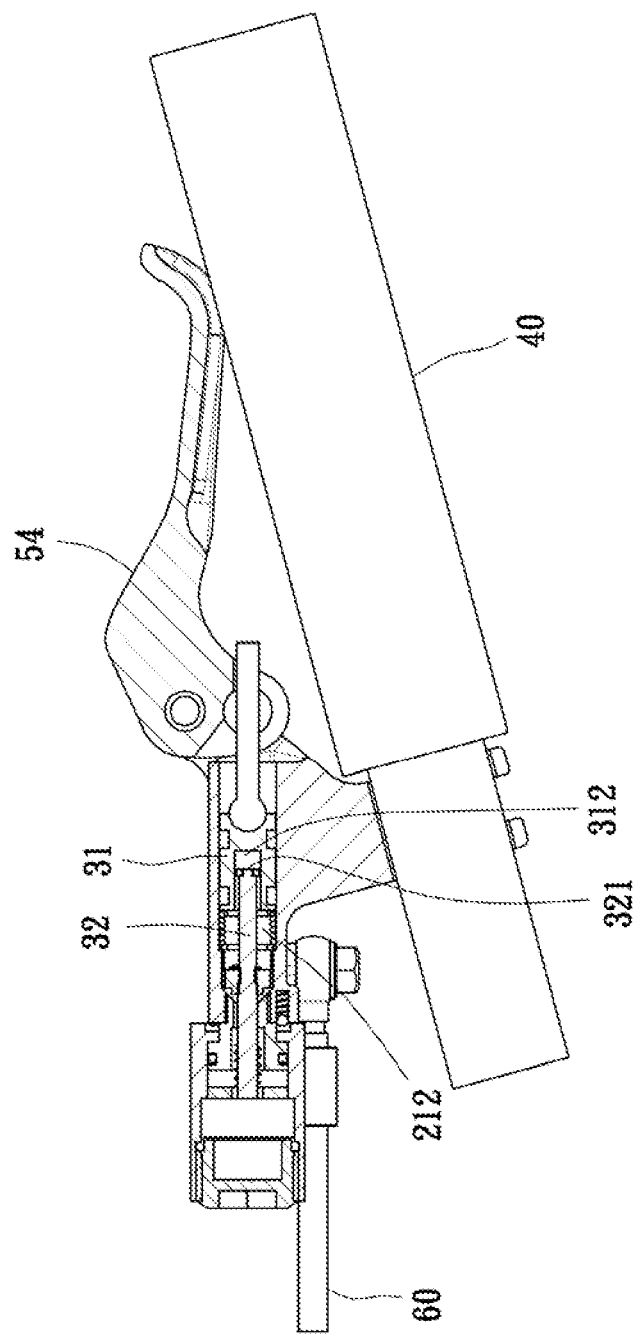
Figure 7:
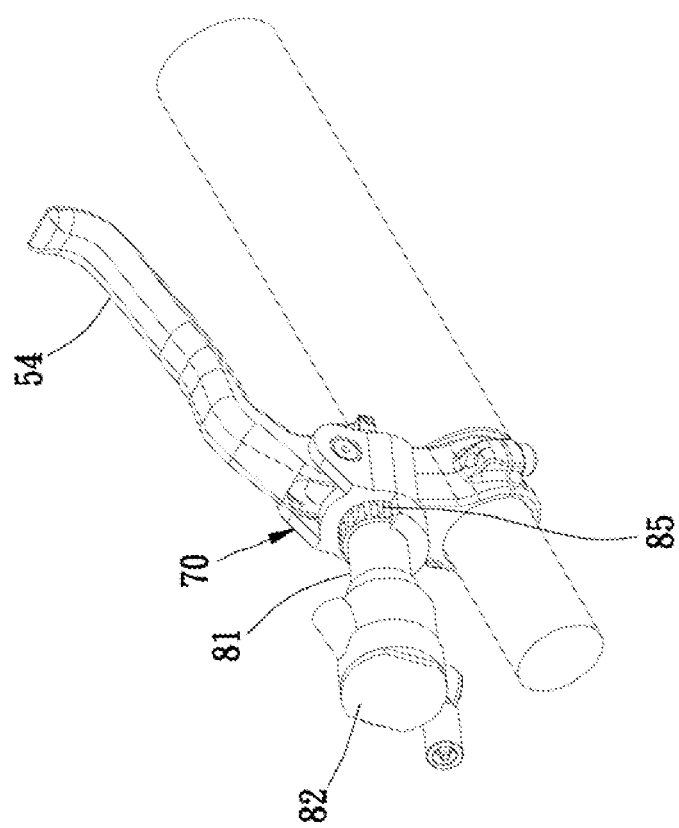
FIG. 7 is an assembled perspective view of a hydraulic brake master cylinder according to a second preferred embodiment of the present invention, which is mounted to a handle bar and connected with a brake lever.
Figure 8:
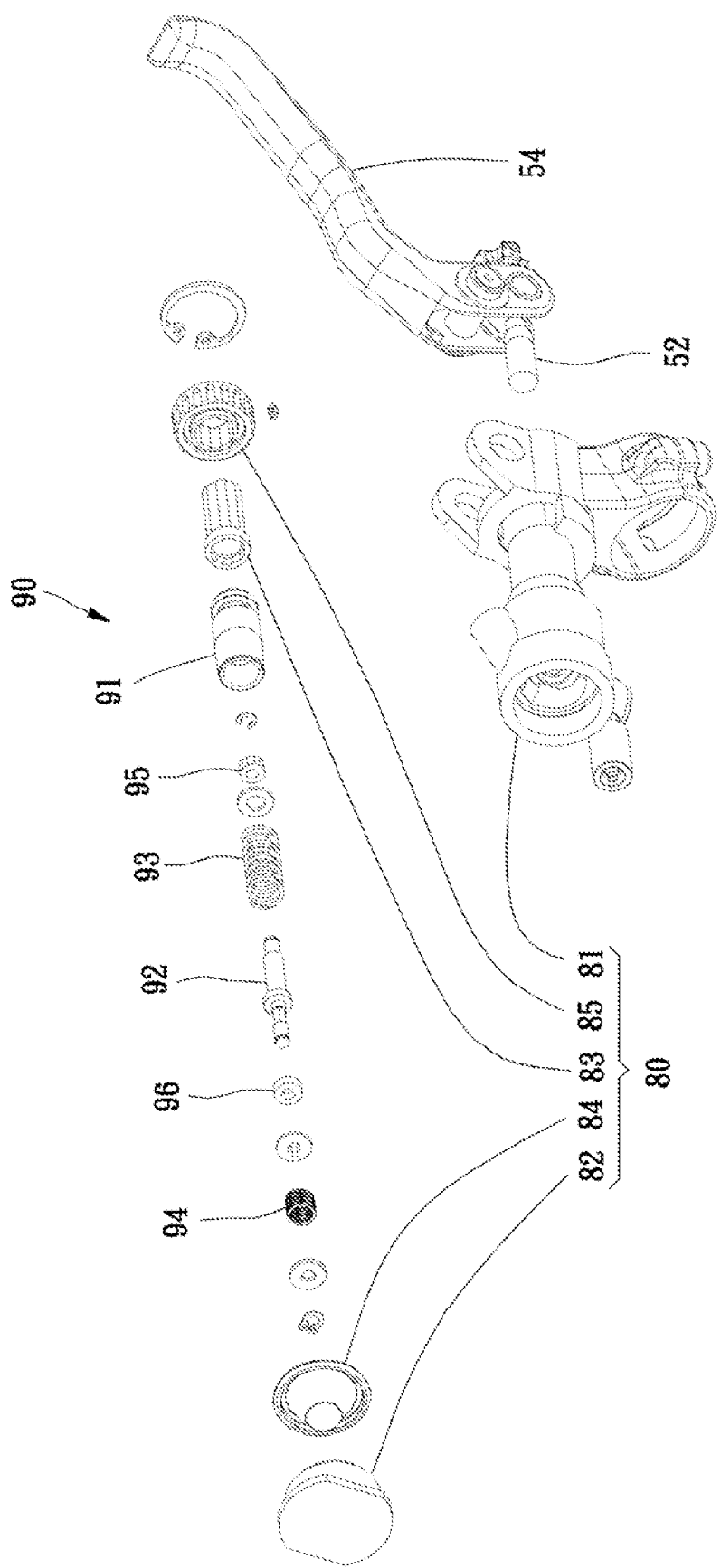
FIG. 8 is an exploded perspective view of the hydraulic brake master cylinder and the brake lever in FIG. 7.
Figure 9:
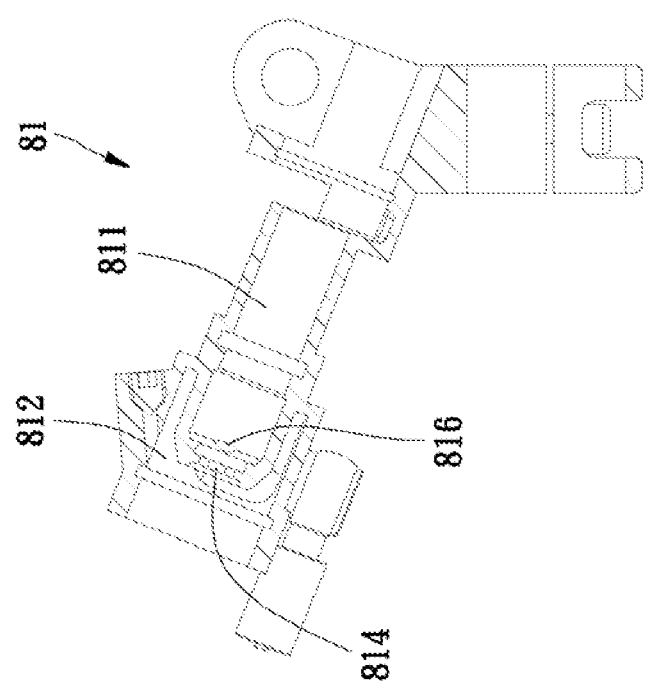
FIG. 9 is a sectional view of a main cylinder body of the hydraulic brake master cylinder according to the second preferred embodiment of the present invention.
Figure 10:
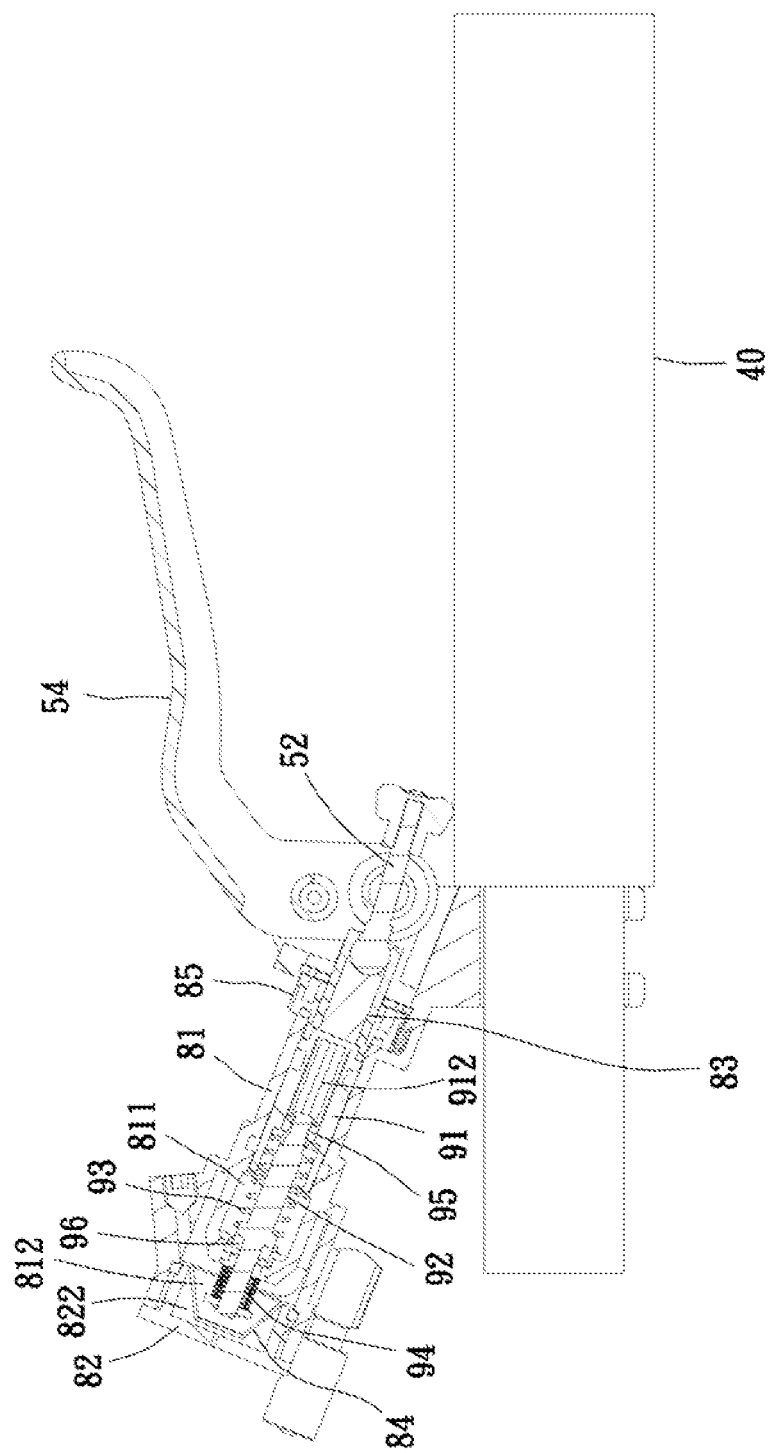
FIG. 10 is a sectional view of the hydraulic brake master cylinder, the handle bar and the brake lever in FIG. 7.

When the hydraulic brake master cylinder 10 is in use, the main cylinder body 21 is mounted to a handle bar 40 of a bicycle in such a way that a connecting linkage 52 is connected between the piston 31 and a brake lever 54, and the first space 212 and the second space 232 are filled with brake fluid. As shown in FIGS. 4-6, in a process of user's pressing the brake lever 54 toward the handle bar 40, the piston 31 is pushed by the connecting linkage 52 to slide from the initial position P1 toward the second space 232. At an initial stage, the rod 32 synchronously moves along with the piston 31 whose axially sliding motion forces the brake fluid in the first space 212 to vent to the second space 232 until the seal 36 abuts against and seals said end of the channel 222, as shown in FIG. 5. Thereafter, because the nut 35 is stopped at the shoulder provided between the first space 212 and the channel 222 the rod 32 can't continuously move toward the second space 232 with the piston 31. Therefore, at this stage the piston 31, which is forced to continuously move toward the second space 232, moves relative to the rod 32 to cause the first end portion 321 of the rod 32 to slide into deep inside of the guide hole 312, as shown in FIG. 6. At the same time, the brake fluid in the first space 212 is vented through the outlet 214 into a hose 60 to initiate the bicycle brake action. In other words, the initial stage, i.e. the period the rod 32 slides along with the piston 31 until the seal 36 seals the channel 222, is a free stroke of the hydraulic brake master cylinder 10, during which no brake fluid is vented out.

If the user feels that the brake reacts too slowly or the brake force is insufficient, the user can rotate the adjuster 23 to make the nut 35 axially move toward the second space 232 relative to the rod 32 to shorten the free stroke of the hydraulic brake master cylinder 10. This feature means the hydraulic brake master cylinder 10 is capable of pad contact point adjustment and can be adjusted by rotating the adjuster 23 without any tool. Another advantage is, the hydraulic brake master cylinder 10 is simple in construction so as to be manufactured and assembled easily.

As shown in FIGS. 7-10, a hydraulic brake master cylinder 70, which is provided by a second preferred embodiment of the present invention, comprises a cylinder unit 80 and an action mechanism 90 disposed in the cylinder unit 80.

The cylinder unit 80 primarily comprises a main cylinder body 81, a cap 82 and a piston rod 83 disposed in two ends of the main cylinder body 81 respectively, a membrane 84 disposed between the cap 82 and the main cylinder body 81, and an adjuster 85 sleeved onto the piston rod 83 in such a way that the adjuster 85 is able to rotate the piston rod 83. The cylinder unit 80 is the same as in aforesaid first preferred embodiment, inside the cylinder unit 80 there are a first space 811, a second space 812, a channel 814 communicating the first space 811 and the second space 812, an outlet 816 communicating the first space 811 with the outside of the cylinder unit 80, and a reserved space 822 developed between the membrane 84 and the cap 82. However, the cylinder unit 80 differs from the cylinder unit 20 in that the first space 811, the second space 812 and the channel 814 are all located inside the main cylinder body 81.

The action mechanism 90 is the same as in aforesaid first preferred embodiment. The action mechanism 90 comprises a piston 91, a rod 92, a first spring 93, a second spring 94, a nut 95 and a seal 96. However, the action mechanism 90 differs from the action mechanism 30 in that the piston 91 is attached to the piston rod 83 which is connected with the brake lever 54 by the connecting linkage 52, and the nut 95 is disposed in the guide hole 912 of the piston 91 and complementary in shape with the guide hole 912. As a result, when the adjuster 85 is rotated by the user, the nut 95 is driven by the adjuster 85 through the piston rod 83 and the piston 91 to synchronously rotate, resulting in that the rod 92 axially moves relative to the nut 95, and the position of the nut 95 relative to the rod 92 changes. Another difference between mechanism 30 and 90 is, the sea 96 is fastened to the rod 92 instead of the nut. Therefore, the user can rotate the adjuster 85 to make the seal 96 move with the rod 92 to change the distance from the seal 96 to the channel 814 so as to change the length of the free stroke of the hydraulic brake master cylinder 70. This feature means the hydraulic brake master cylinder 70 is capable of pad contact point adjustment and can be adjusted by rotating the adjuster 85 without any tool. This hydraulic brake master cylinder 70 is also simple in construction allowing it to be manufactured and assembled easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic brake master cylinder comprising:
   a cylinder unit including a first space, a second space, a channel communicating the first space and the second space, an outlet communicating the first space with the outside of the cylinder unit, and an adjuster exposed outside;
   a piston, provided with a guide hole and axially slidably disposed in the first space;
   a first spring, applying an elastic force to the piston;
   a rod, having a first end portion disposed in the guide hole of the piston in a way that the first end portion is slidable in the guide hole of the piston when the piston is forced to slide in the first space relative to the rod, and a second end portion disposed opposite to the first end portion;
   a second spring, applying an elastic force to the second end portion of the rod;
   a seal, attached to the rod, and moving controllably to seal the channel so as to block the first space from communicating with the second space; and
   a nut threaded onto the rod;
   wherein the adjuster is rotatable to make the nut and the rod rotate with respect to each other so as to change the distance between the seal and the end of the channel.

2. The hydraulic brake master cylinder as claimed in claim 1, wherein the cylinder unit further comprises a main cylinder body, the main cylinder body is tubular.

3. The hydraulic brake master cylinder as claimed in claim 2, wherein the cylinder unit further comprises a connector, both the connector and the adjuster are tubular.

4. The hydraulic brake master cylinder as claimed in claim 3, wherein the cylinder unit further comprises a cap, the connector is attached to one end of the main cylinder body; one end of the adjuster is rotatably attached to the connector; the cap is attached to another end or the adjuster.

5. The hydraulic brake master cylinder as claimed in claim 3, wherein the first space, the second space and the channel are formed inside the main cylinder body, the adjuster and the connector respectively.

6. The hydraulic brake master cylinder as claimed in claim 1, wherein the second end portion of the rod is complementarily received in the adjuster so that the rod is rotatably driven by the adjuster directly.

7. The hydraulic brake master cylinder as claimed in claim 1, wherein the seal is located between the connector and the nut and fastened to the nut.

8. The hydraulic brake master cylinder as claimed in claim 1, wherein the cylinder unit further comprises a main cylinder body, a cap and a piston rod attached to two ends of the main cylinder body respectively, the piston rod is connected to the piston, the adjuster is sleeved onto the piston rod in such a way that the adjuster is able to rotate the piston rod, the nut is rotatably driven by the adjuster through the piston rod and the piston.

9. The hydraulic brake master cylinder as claimed in claim 8, wherein the nut is complementary in shape with the piston.

10. The hydraulic brake master cylinder as claimed in claim 8, wherein the nut is complementary in shape with and disposed in the guide hole of the piston.

* * * * *